United States Patent
Harrington et al.

(10) Patent No.: US 7,596,092 B2
(45) Date of Patent: Sep. 29, 2009

(54) VOIP VERIFIER

(75) Inventors: Kendra S. Harrington, Irvine, CA (US); Matthew McRae, Laguna Beach, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 582 days.

(21) Appl. No.: 11/346,917

(22) Filed: Feb. 2, 2006

(65) Prior Publication Data

US 2007/0177514 A1 Aug. 2, 2007

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl. .................. 370/241; 370/260; 370/352; 379/88; 709/223

(58) Field of Classification Search ......... 370/241–248, 370/331–356, 260–265; 709/207–223; 379/88
See application file for complete search history.

(56) References Cited

U.S. PATENT DOCUMENTS

| 7,099,304 | B2 * | 8/2006 | Liu et al. ................... 370/352 |
| 2006/0007915 | A1 * | 1/2006 | Frame ....................... 370/352 |
| 2006/0154661 | A1 * | 7/2006 | Gonen et al. ............. 455/435.1 |
| 2006/0265487 | A1 * | 11/2006 | Woods ....................... 709/223 |
| 2006/0268844 | A1 * | 11/2006 | Mori et al. ................. 370/352 |
| 2007/0025278 | A1 * | 2/2007 | McRae ....................... 370/260 |
| 2007/0081520 | A1 * | 4/2007 | Da Palma et al. .......... 370/352 |
| 2007/0160086 | A1 * | 7/2007 | Huang et al. ............... 370/493 |
| 2007/0255952 | A1 * | 11/2007 | Zhou ......................... 713/168 |
| 2008/0176533 | A1 * | 7/2008 | Leleu ........................ 455/411 |

* cited by examiner

*Primary Examiner*—Man Phan
(74) *Attorney, Agent, or Firm*—Haynes and Boone, LLP

(57) ABSTRACT

VoIP verification is initiated by subscriber-side test VoIP appliance, or VoIP proxy agent. Test VoIP appliance is coupled to test node over a communications internetwork by upstream and downstream datapaths. VoIP verification request is transmitted to test node. Responsively, test node transmits VoIP verification signal to test VoIP appliance. Perceivable indication of verification signal received by VoIP appliance is effected by visual display, audible indication, or both. Operational state verifier apparatus is disposed in a digital telephony device, a computer terminal, or with an ATA interface coupled to analog telephony device used in VoIP communications system.

16 Claims, 3 Drawing Sheets

VOIP VERIFIER

TECHNICAL FIELD

The invention herein pertains to communications systems, and particularly to packetized voice data communications systems.

BACKGROUND

A Voice-over-Internet Protocol (VoIP) appliance is an endpoint communication device, which reflects the convergence of computer, communication, and networking technologies. A VoIP appliance encodes a voice signal as data, and transmits the voice data over communication links employing the Internet Protocol. The Internet Protocol (IP) is a network-layer (OSI Model Layer 3) protocol that contains addressing and control information to permit data packets to be routed in a network. From a consumer perspective, a VoIP telephone has broad consumer appeal, because it appears much like a traditional analog telephone, using traditional, well characterized, and generally stable public switched-circuit telephony networks, yet provides functions and features that extend beyond those found in traditional telephony products.

From a technical perspective, a VoIP appliance can be viewed as a sophisticated digital communications exchanging voice and traditional data signals over heterogeneous communications links within a global communications internetwork. A voice signal outbound from a VoIP appliance usually traverses communication links that constitute part of a public, store-and-forward, switched-packet network, which facilitates timely voice data exchange over multiple transmission media (e.g., fixed or wireless media) and multiple communications modes (e.g., optical or electromagnetic modes). Therefore, despite its favorable comparison to conventional analog telephony devices, VoIP appliances can be a component of an inherently complex end-to-end digital communications system. The nearly-universal consumer expectation for simplicity in product installation, and for reliability over a product's lifespan appear to be in tension with the practical difficulties that may arise when attempting to reliably communicate time-sensitive data over a vast web of loosely-compatible elements. Increasingly, private and business consumers alike demand automated product installation, maintenance, troubleshooting, and repair using software agents and dedicated applications, called wizards, to minimize the perceived the burdens of sophisticated device ownership. Traditionally, after installation and set-up, a VoIP service-provider (VSP) transmits a test signal to verify the basic functionality of a VoIP appliance.

However, such limited provider-side functional testing tends to verify only downstream functionality of the VoIP appliance, that is, inbound communications to the VoIP appliance from the VSP. Until the VoIP appliance user unsuccessfully attempts to place an outbound VoIP call, the unverified upstream datapath, from the VoIP appliance to the VSP, is presumed to be functional by the consumer and by the VSP. Therefore, it is desirable to provide subscriber-side VoIP verification, which includes verification of at least one VoIP appliance upstream datapath (i.e., signaling, media, or both). It also is desirable to provide simplified installation, troubleshooting, maintenance, and repair procedures, with minimal intervention, if any, by VSP technical or customer service personnel.

DETAILED DESCRIPTION OF THE EMBODIMENTS

In the consumer market, successful products are perceived to be affordable, reliable, and capable of extended use. However, perceived "user-friendliness" is frequently a determinative factor in the selection of a product by consumers. A user-friendly product may employ relatively simple procedures for installation, configuration, maintenance, use and troubleshooting. Also, a "friendly" consumer product tends to offer timely, informative, and comprehensible prompts, messages, and status information that is both relatively complete and accurate.

In general, the inventive embodiments herein contemplate apparatus and methods of subscriber-side VoIP verification, that is, where a verification request is initiated by, or on behalf of, a subscriber-side VoIP appliance, and is transmitted over an upstream datapath to a VoIP test node. In response to the subscriber-side VoIP verification request, the VoIP test node transmits a VoIP verification signal over a downstream datapath to the test VoIP appliance. The VoIP verification signal may include a VoIP operational state. Advantageously, the embodiments described herein facilitate VoIP appliance verification and provide a VoIP appliance user with a perceivable representation of a VoIP verification signal. Selected embodiments may provide a perceivable representation of a preselected VoIP operational state, which may be used to install, configure, use, maintain, or troubleshoot, a VoIP appliance, a VoIP service, or a combination thereof. It is desirable that the representation be perceived as timely, informative, comprehensible, accurate and, ultimately, friendly by a VoIP appliance user. In general, packetized voice (PV) applications, services, and devices encompass Voice over Internet Protocol (VoIP) applications, services and devices. VoIP implementations are considered to be exemplary of PV implementations, thus, without loss of generality, references to VoIP hereafter comprehend packetized voice implementations.

Figure 1:
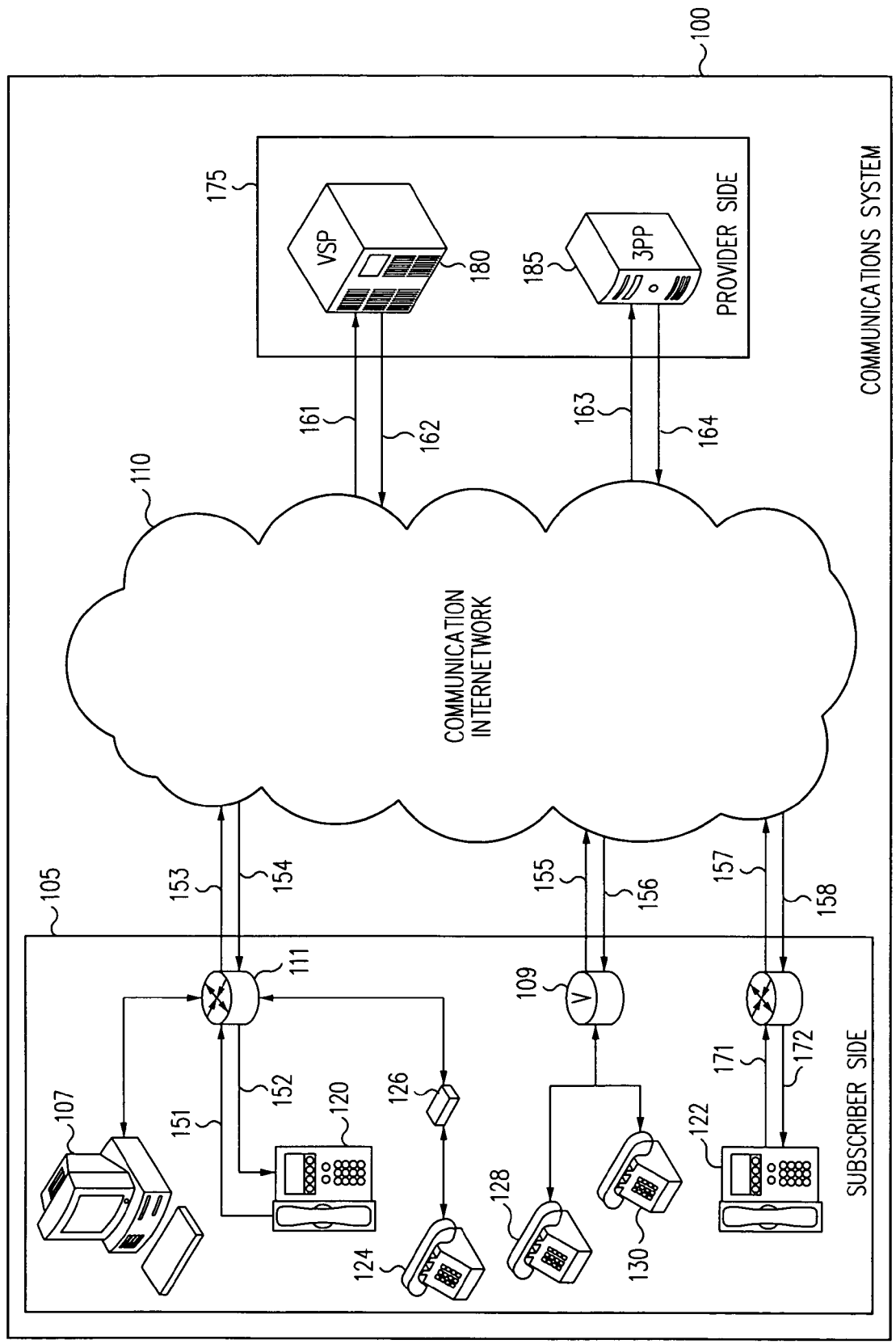
FIG. 1 is a diagrammatic representation of a communications system 100, illustrating selected inventive embodiments described herein.

Turning to FIG. 1, inventive VoIP applications, services, and devices herein are beneficially implemented within the context of exemplary communications system 100. Communications system 100 may be characterized broadly as including subscriber side subnetwork (SS subnet) 105 and provider side subnetwork (PS subnet) 175, with communications internetwork 110 coupled therebetween. In general, SS subnet 105 may represent a network of communications appliances and subsystems, controlled, operated, or owned, by one or more respective VoIP service subscribers (not shown). Typically, a VoIP subscriber is granted access to VoIP services, pursuant to a VoIP service agreement (VSA) with a VoIP service provider (VSP—not shown). Under the terms of the VSA, a VSP may provision subscriber access to communications internetwork 110, for example, by controlling at least one SS uplink 153, 155, 157, at least one SS downlink 154, 156, 158, or an operable combination thereof. PS subnetwork 175 may represent provider systems and services, as represented by VSP node 180 or by third-party provider (3PP) node 185. VSP node 180 can be a constituent of a VoIP service network under the control of one or more VSP. Similarly, 3PP node 185 can be a constituent of a VoIP, or digital data service network, under the control of one or more third-party providers (3PP). A subscriber may use 3PP services, and access 3PP devices and networks, by a service agreement separate from, or within the context of, a VSA. Although VSP node 180 and 3PP node 185, each may be components of respective VSP or 3PP administrative, billing, provisioning, and maintenance facilities, it is not a requirement.

A VoIP communication with a VoIP appliance may constitute one or both of transmitting a VoIP outbound signal over an upstream datapath and of receiving a VoIP inbound signal over a downstream datapath. In general, a datapath includes at least one link. Terms such as upstream, downstream, uplink, downlink, outbound, and inbound are relative to a test VoIP appliance point of reference. Moreover, as used herein, a datapath may include one or both of signaling and media datapaths. Therefore, a logical datapath may include both an uplink in an upstream datapath from one VoIP appliance, and a downlink to another VoIP appliance. For example, when a subscriber directs a VoIP communication from a first VoIP appliance 120 to a second VoIP appliance 122 in SS subnet 105, first VoIP appliance 120 transmits a VoIP outbound signal over uplinks 151, 153 in its upstream datapath as well as over downlinks 158, 172 in the downstream datapath for second VoIP appliance 122. An upstream datapath may include at least one SS uplink 153, 155, 157; and a downstream datapath may include at least one SS downlink 154, 156, 158. SS subnet 105 can be coupled to communications internetwork 110 by one or both of at least one SS uplink 153, 155, 157 and at least one SS downlink 154, 156, 158. Similarly, PS subnet 175 can be coupled to communications internetwork 110 by one or both of at least one PS uplink 161, 163 and at least one PS downlink 162, 164. Each SS uplink 153, 155, 157 may be paired with a respective SS downlink 154, 156, 158; each PS uplink 161, 163 may be paired with a respective PS downlink 162, 164; however, such pairing is not a requisite. Each of SS uplinks 153, 155, 157, SS downlinks 154, 156, 158, PS uplinks 161, 163 and PS downlinks 162, 164 may communicate signals, using any current or contemplated communication method (e.g., fixed wire or wireless), and by any current or contemplated communication mode (e.g., RF or optical), capable of implementing network-layer protocols such as Internet Protocol, and functional equivalents thereof.

Communication internetwork 110 itself may consist of one or more uplinks and one or more downlinks which, when operably coupled to the respective upstream datapath or downstream datapath of a VoIP appliance, also may convey a VoIP outbound signal or a VoIP inbound signal, respectively. Although specific links within internetwork 100 are not illustrated, it is sufficient that internetwork 110 provide continuity of communication in the upstream and downstream datapaths between a VoIP appliance in subscriber side subnetwork (SS subnet) 105 and a test node. The test node maybe disposed in subscriber side subnetwork (SS subnet) 105 or in provider side subnetwork (PS subnet) 175.

The nature, location, and number of uplinks in an upstream datapath, and downlinks in a downstream datapath may depend, in part, on defined configurations, operational factors, or dynamic factors, and combinations thereof. Representative defined configurations can include the contractually defined configurations described in VSA and others service contracts, as well as a myriad of generally static and possibly interdependent factors encompassing infrastructure, topological, tariff, and political factors. Representative operational factors include addressing and message transmission types (unicast, multicast, etc.). Representative dynamic factors include jitter, delay, packet loss, available bandwidth, network status, network load, network traffic, Quality of Service demands, and so on.

Exemplary inventive embodiments within the context of communications system 100 contemplate methods and apparatus by which a VoIP verification request can be initiated by a subscriber-side test VoIP appliance, for example first VoIP appliance 120, or by a proxy agent VoIP appliance. The VoIP verification request may then be transmitted over an upstream datapath to a VoIP test node, including, without limitation, VSP node 180, 3PP node 185, and second VoIP appliance 122. The upstream datapath may include an upstream signaling datapath, an upstream media datapath, or both. In response to the VoIP verification request, the VoIP test node can transmit a VoIP verification signal over a downstream datapath to the test VoIP appliance 120. The downstream datapath may include a downstream signaling datapath, a downstream media datapath, or both. The VoIP verification signal may include a preselected VoIP operational state. The test VoIP appliance can provide a perceivable representation of the VoIP verification signal to the VoIP appliance user. The VoIP verification signal may include a preselected VoIP operational state, which state also may be perceivably represented to the VoIP. The VoIP operational state can be representative of an upstream datapath, or a downstream datapath, and may be representative of both an upstream datapath and a downstream datapath. Likewise, the VoIP operational state can be representative of a signaling datapath or a media datapath, and may be representative of both a signaling datapath and a media datapath. In addition, the VoIP operational state may be representative of an upstream signaling datapath, an upstream media datapath, a downstream signaling datapath, a downstream media datapath, or a combination thereof. Moreover, a proxy agent may initiate a subscriber-side VoIP verification request on behalf of a test VoIP appliance. Exemplary proxy agents include one of a subscriber-side computing device, such as suitably configured PC 107, and functional equivalents, and a subscriber-side communication appliance, such as second VoIP appliance 122.

Although SS subnet 105 and its constituent functions are illustrated within the context of VoIP first appliance 120 and VoIP second appliance 122, SS subnet 105 may include any endpoint communication appliance adaptable to provide a VoIP signal. It is well known that a VoIP interface or a VoIP adaptor may be implemented in hardware, software, or an operable combination thereof. Such adaptability advantageously brings nearly every known communications appliance, including analog telephony appliances coupled with a suitable VoIP adaptor, within the scope of the present invention.

For example, analog handset 124 can be coupled to an interface (ATA 126) to perform the requisite conversions between analog telephony and VoIP signaling methods. Analog handset 124 can bidirectionally exchange suitable VoIP telephony signals with an existing digital router 111 through interface ATA 126. Likewise, it is desirable to provide the substantial existing infrastructure of analog telephony appliances with VoIP functionality. VoIP-integrated router 109 is capable of providing an interface between analog telephony signaling and digital VoIP signaling. VoIP-integrated router 109 also can offer traditional digital switching and routing services, as well as PBX-like switching. Therefore, VoIP integrated router 109 may adapt analog telephony appliances, such as appliances 128, 130 to receive VoIP services, individually, or as a pool.

Computer terminal (PC) 107 can be operated to execute a setup, configuration, and initialization program, called a setup wizard. The setup wizard (not shown) may configure one or more of router 111, first VoIP appliance 120, or ATA 126. Also, PC 107 may communicate with directly with digital router 111 to perform operational functions, such as one or more of a maintenance configuration, a telephony control configuration, or a VoIP function. PC 107 also may be configurable for service as a VoIP appliance. In selected embodiments according to the present invention, a VoIP appliance user may employ a program on PC 107, namely a setup wizard, to install endpoint VoIP appliance 120. Under control of the setup wizard, PC 107 can act as a proxy agent, on behalf of VoIP appliance 120, to initiate a subscriber-side VoIP verification request to a VoIP test node, here VSP node 180 on PS subnet 175. In response to the subscriber-side VoIP verification request, VSP node 180 can transmit a VoIP verification signal, which may be a downstream call, to test VoIP appliance 120. Successful completion of the downstream call may verify both upstream and downstream VoIP operations, the ability of test VoIP appliance 120 to send and receive VoIP signals and calls, and the validity of telephone number of test VoIP appliance 120. Upon receiving the inbound VoIP call, the user of test VoIP appliance 120 can receive a perceivable representation of the VoIP verification signal, for example, in the form of a recorded voice saying, "Congratulations, your VoIP service is active." The perceivable representation of the VoIP verification signal also may apprise the VoIP user of preselected VoIP operational state, for example, in the form of a recorded voice saying, "Congratulations, your VoIP service is active. Please contact Customer Service, referencing Ticket 3GX2." In the present example, the preselected VoIP operational state is represented by the arbitrary identifier "Ticket 3GX2," which may describe an operational state of interest to a VSP, although the user received favorable verification of the test VoIP appliance operation. Specific fault and problem traceback data may be conveyed in the preselected VoIP operational state, although such is not a requisite limitation of an embodiment, unless so desired. Alternatively, it may be desirable to automatically detect a VoIP state indicative of a datapath degradation or fault, to initiate a technical service or support contact to ameliorate the datapath degradation or fault, and to apprise the VoIP user of the VoIP operational state, as well as confirm that a troubleshooting and repair request was placed with an appropriate technical service or support contact.

Additionally, PC 107 may serve as a proxy agent using, for example, a setup wizard and embedded software telephony code, to transmit a VoIP verification request in the form of placing a test call to the purported VoIP number of test VoIP appliance 120. The test call request can be routed over SS uplink 153, internetwork 110, and PS uplink 161 to VSP server 180. VSP server 180 can respond to the VoIP verification request by generating a VoIP verification signal, which may be in the form of the requested downstream call. The VoIP verification signal may be routed, as an inbound call, over PS downlink 162, internetwork 110, SS downlink 154, and through router 111 to appliance downlink 152. The inbound call causes test VoIP appliance 120 to respond with an inbound call-ringing signal. The user answering test VoIP appliance 120 receives a perceivable representation of the VoIP verification signal, for example, in the form a recorded voice, saying "Congratulations, your VoIP service is active." The inbound VoIP verification signal also may convey preselected VoIP operational state information, which may be communicated to the test VoIP appliance user in diverse ways.

In other embodiments of the present invention, a VoIP verification request can be generated in accordance with a suitable upper-layer communication protocol, as may be exemplified by Internet-type messaging protocols like the well-known Session Initiation Protocol (SIP) protocols and functional equivalents thereof (in the aggregate "SIP"), including OSI lower layer protocols supporting interactive multimedia communications across the Internet. In general, SIP is a text-based, application-layer control protocol that is often used to establish, modify, and terminate multimedia sessions. SIP can manage telephony sessions, similar to existing telephony protocols. However, SIP can extend the range of telephony services offered to SIP-enabled endpoint communication appliances and can manage a variety of interactive multimedia network sessions between such appliances, agents, proxies, clients and servers coupled to the Internet. Although the use of a SIP signaling protocol is illustrated herein, a person having ordinary skill in the art would understand that other signaling protocols may be used, including those facilitating real-time session signaling over packet-based networks. Exemplary signaling protocols include SIP, the vertically integrated H.323 protocol suite and the media gateway controller protocol (MGCP). The MGCP protocol standard has been adopted by the ITU as ITU Recommendation H.248 and by the IETF, as MEGACO. Communications internetwork 110 may include all or part of the global network commonly called the Internet.

Within this context, test VoIP appliance 120 can act as a subscriber-side SIP user agent (SUA) to transmit a VoIP verification request to a provider-side SIP agent or proxy server or (PUA), exemplified by VSP node 180. In this example, a useful VoIP verification request may be a SIP Uniform Resource Identifier (URI) encoded with SUA contact information (e.g. the test VoIP appliance telephone number, or CALLID), and a solicitation for a return call from a PUA as a VoIP verification signal. As noted, above, a VoIP verification request may be initiated by test VoIP appliance 120, 122, or by a proxy agent. As used herein, the term SUA may encompass test VoIP appliance 120, 122, as well as proxy agents, such as PC 107, an initiating VoIP appliance 120, 122, other than the test VoIP appliance, or another suitable adapted communication appliance. Where a proxy agent creates the URI on behalf of test VoIP appliance 120, 122, the proxy agent SUA may substitute the test VoIP appliance contact information (e.g., telephone number) in place of the SUA contact information.

By receiving the URI from the SUA (e.g., test VoIP appliance 120, 122), the PUA (e.g., VSP node 180 or 3PP node 185) receives operational verification of upstream datapaths 151, 153, 161 from test VoIP appliance 120, as well as a confirmation of the identity of the VoIP appliance 120, 122 sending the URI. Registration information and other subscriber data may be encoded therein, for example, to simplify VoIP appliance registration, service affiliation, QoS accommodations, network routing or handoff data, and the like. In response to the VoIP verification request URI from the SUA (e.g., test VoIP appliance 120, 122), the PUA (e.g., VSP node 180 or 3PP node 185) may transmit an inbound VoIP verification signal over the downstream datapath to test VoIP appliance 120, 122, in the form of the solicited return call. The user answering the test VoIP appliance 120 can receive a perceivable representation of the inbound VoIP verification signal, for example, in the form of a pre-recorded message, or a message displayed on test VoIP appliance 120, 122.

In yet other embodiments of the present invention, test VoIP appliance 120, 122 can be configured to place an outbound VoIP verification request to a test node, such a VSP node 180, induced by a selected event such as initial power-up of, or completion of a predetermined key sequence on, test VoIP appliance 120, 122. The outbound VoIP verification request can induce VSP node 180 to attempt to reply to test VoIP appliance 120, 122, by transmitting an inbound VoIP verification signal. If unsuccessful, VSP node 180 may make successive attempts to transmit the inbound VoIP verification signal to test VoIP appliance 120, 122, at predetermined intervals, until test node 180 successfully transmits the VoIP verification signal.

In still other embodiments of the present invention, test VoIP appliance 120, 122 can be configured to place an outbound VoIP verification request to a test node, such a VSP node 180, induced by a selected event such as initial power-up of, or completion of a predetermined key sequence on, test VoIP appliance 120, 122. If test VoIP appliance 120, 122 is unsuccessful in contacting VSP node 180, VoIP appliance 120, 122 may make successive attempts to transmit the outbound VoIP verification signal at predetermined intervals until test node 180 successfully receives the VoIP verification signal.

Figure 2:
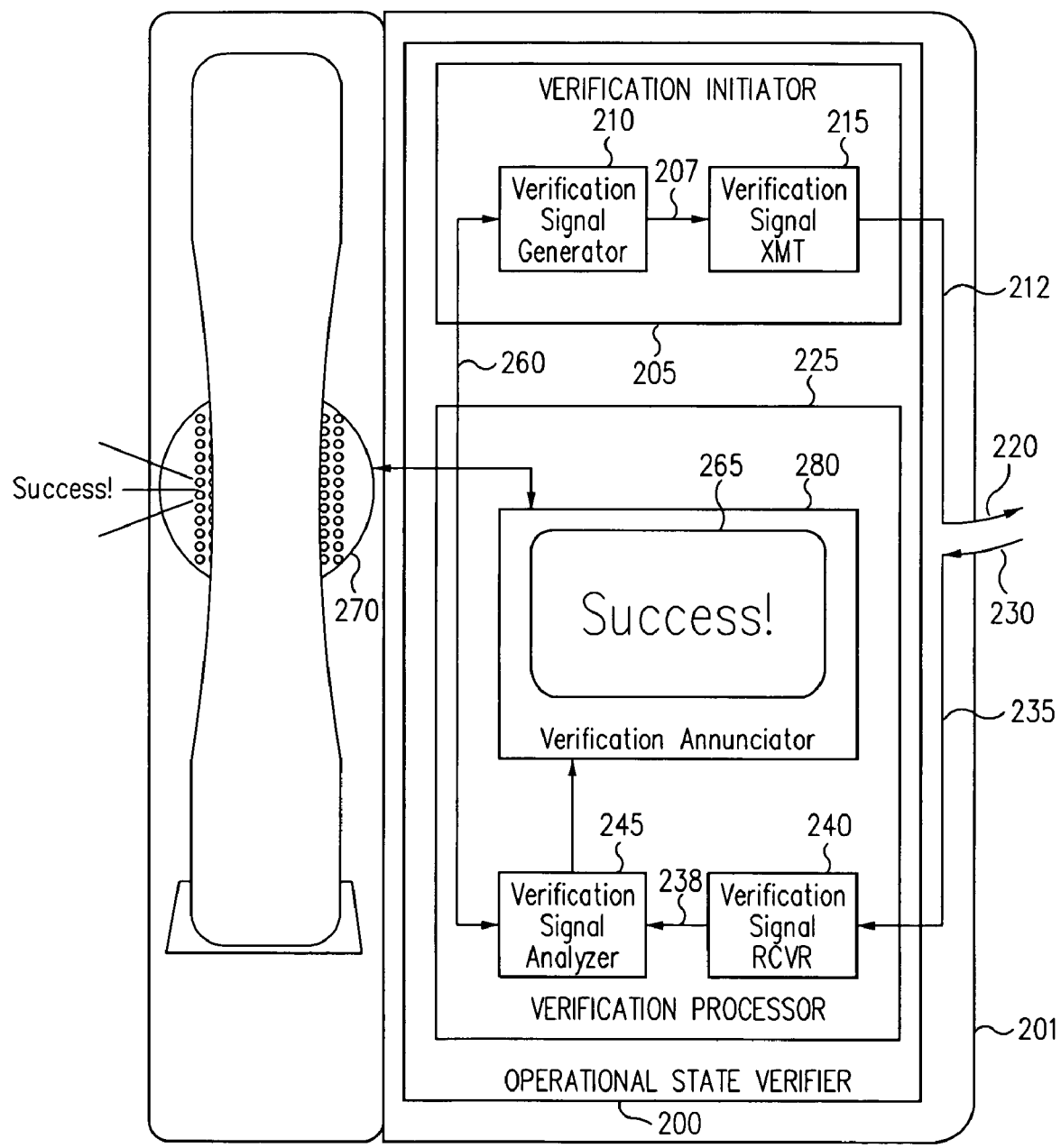
FIG. 2 is a diagrammatic representation of operational state verifier disposed in a VoIP appliance, according to an embodiment of the present invention.

FIG. 2 illustrates an embodiment of operational state verifier 200 disposed in test VoIP appliance 201, according to teachings of the present invention. Test VoIP appliance 201 may be similar to VoIP appliance 120, 122, which each may have verifier 200 disposed therein, and may be coupled to communications system 100 of FIG. 1. Verifier 200 also may be operably disposed within computing system 107, VoIP integrated router 109, ATA 126, and other interface devices enabling the exchange of VoIP data signals. In general, operational state verifier 200 includes verification initiator 205 and verification processor 225. Verification initiator 205 may include means, such as verifier signal generator 210, for generating an outbound verification request 207, coupled to means, such as verifier signal transmitter (XMT) 215, for transmitting outbound verification request signal 212 over test VoIP appliance uplink 220. Test VoIP appliance uplink 220 can be functionally similar to appliance uplink 151 of test VoIP appliance 120 in FIG. 1, in that outbound verification request signal 212 can be directed to a test node over an upstream datapath, which may include at least one intermediate uplink, by way of a router similar to router 111, in FIG. 1. The upstream datapath may be a designated upstream datapath, intended to direct outbound verification request 212 to a designated test node. Looking to FIG. 1, a designated test node may include VSP node 180, 3PP node 185, or selected VoIP appliance 122 in SS subnet 105. In response to receiving VoIP verification request 212, the designated test node can transmit VoIP verification signal 235 to test VoIP appliance 201 over test VoIP appliance downlink 230, in a manner similar to that illustrated with respect to FIG. 1.

In test VoIP appliance 201, means for receiving a VoIP verification signal can admit received VoIP downstream signal 235 over appliance downlink 230, can produce received, and is exemplified by verifier signal receiver (RCVR) 240. Means for analyzing the received VoIP downstream signal, represented by verifier signal analyzer 245, can produce a VoIP verification signal 238 from received VoIP downstream signal 235. When signal 238 includes therein a VoIP operational state, means for analyzing can further determine the VoIP operational state from signal 238. Means for perceivably indicating the VoIP verification signal, such as verifier annunciator 280, can be coupled to the means for analyzing and producing a perceivable indication of the VoIP verification signal, the VoIP operational state, or both. Verifier annunciator 280 may issue a visually perceivable indication to the operator of VoIP appliance 201 using verifier visual annunciator 265, which can be a simple LCD display. Verifier annunciator 280 also may issue an aurally perceivable indication using audible annunciator 270, which may be a simple audio speaker.

A favorable VoIP verification signal may indicate to the operator that the VoIP appliance is properly installed, that the requested VoIP service has been activated, and that the identifier for the VoIP appliance (e.g., telephone number) is correct. Thus, a perceivable VoIP verification may consist of a visual "SUCCESS" display or comparable audible synthesized voice statement. When so encoded, the preselected VoIP operational state may bear additional information regarding an operational state pertaining to at least part of a communications system, such as communications system 100, in FIG. 1, including respective operational states of the an upstream signaling datapath, an upstream media datapath, a downstream signaling datapath, a downstream media datapath, or a combination thereof, and other diagnostic, troubleshooting, and Quality of Service metrics. Test loop link 260 may facilitate use of VoIP appliance 201 as a designated test node, for example, by facilitating forming and transmitting an outbound VoIP verification signal over uplink 220, in response to an analyzed inbound VoIP verification request received over downlink 230.

Figure 3:
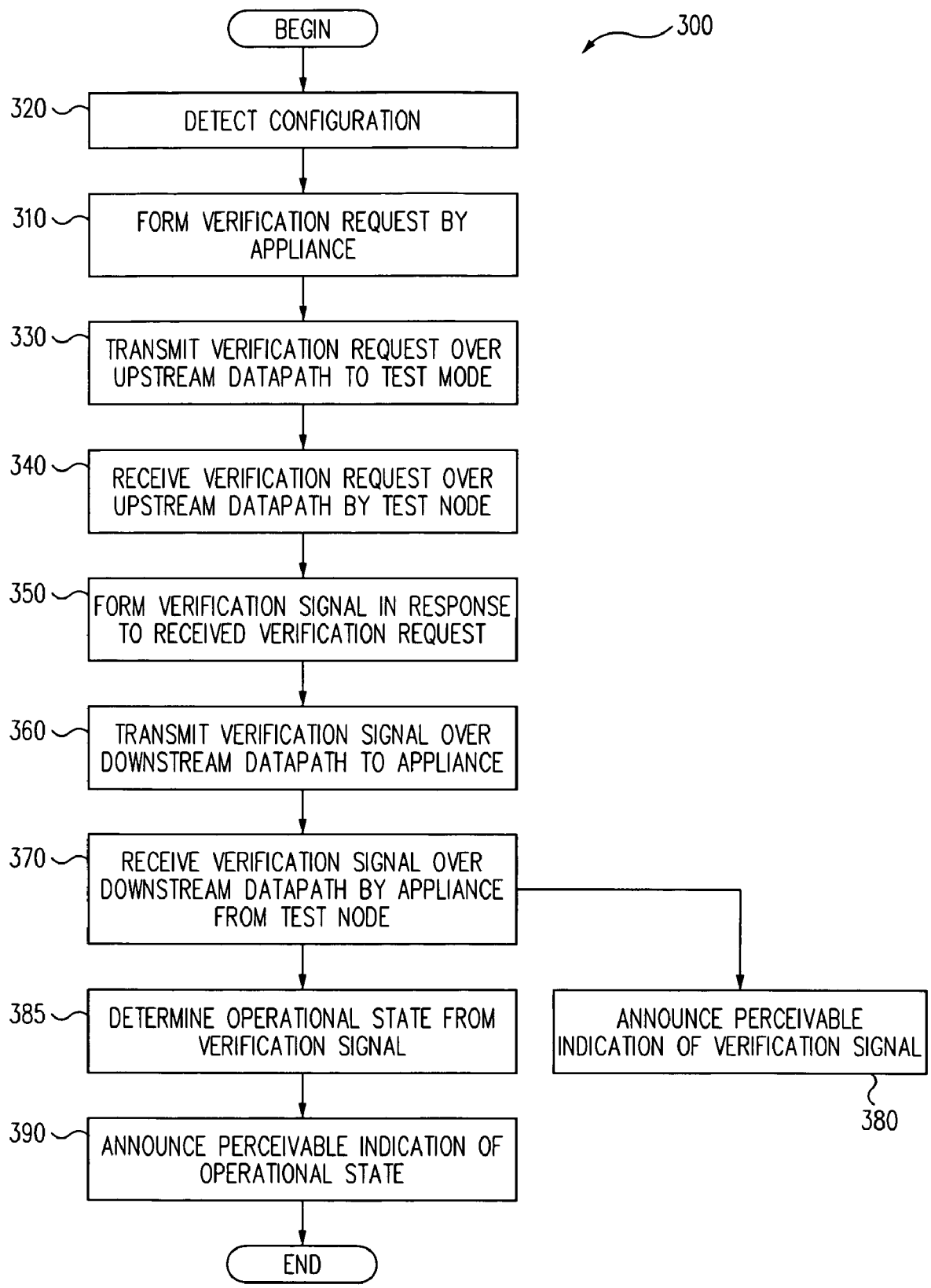
FIG. 3 is an exemplary flow diagram illustrative of a method for VoIP operation verification, according to an embodiment of the present invention.

FIG. 3 illustrates a method for VoIP verification, generally at (300). Method (300) may include forming (310) a VoIP verification request by, or on behalf of, a test VoIP appliance, which may be prompted by detecting (320) VoIP appliance configuration. The method also may include transmitting (330) the VoIP verification request across an upstream datapath. Upon receiving (340) the VoIP verification request from a test VoIP appliance, the suitably configured test node responds by forming (350) a VoIP verification signal and by transmitting (360) the VoIP verification signal over a downstream datapath to the test VoIP appliance. The test node may encode a preselected VoIP operational state into the VoIP verification signal. Upon receiving (370) the VoIP verification signal, the receiving test VoIP appliance may notify an operator of the test VoIP appliance by announcing (380) a perceivable indication of VoIP verification signal. Announcing may include, without limitation, a visual verification, an audible verification, or a combination thereof. When the test node encoded a preselected VoIP operational state into the VoIP verification signal, the test VoIP appliance may determine the preselected VoIP operational state by analyzing (385) the VoIP verification signal. Desirably, the VoIP operational state can be representative of an upstream signaling datapath, an upstream media datapath, a downstream signaling datapath, a downstream media datapath, or a combination thereof. With this VoIP operational state thus identified, the method continues by announcing (390) a perceivable indication of VoIP operational state. Similarly, announcing may include, without limitation, a visual verification, an audible verification, or a combination thereof.

For simplicity in exposition, the above embodiments are described for a perspective of use during communication appliance installation, configuration, and startup. However, they are not so limited, and may be applied over the term of a subscriber's VSA, as well as to any suitable end during the VoIP appliance product life. Also, a person of ordinary skill in the art understands that embodiments of the apparatus and methods herein may be embodied in hardware, in software, or in an operable combination thereof.

Many substitutions, modifications, alterations, and equivalents may now occur, and be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent and what incorporates the idea of the invention.

What is claimed is:

1. A VoIP appliance coupled by an upstream datapath to a test node and by a downstream datapath from the test node, the VoIP appliance comprising:
   a verification initiator configured to communicate a VoIP verification request to the test node, whereby the test node responds with a VoIP verification signal; and
   a verification processor configured to receive the VoIP verification signal from the test node, and further configured to provide a perceivable indication of the VoIP verification signal, wherein the verification processor comprises:
      a verifier signal receiver configured to receive the VoIP verification signal from the test node;
      a verifier signal analyzer configured to determine a VoIP operational state from the VoIP verification signal; and
      a verifier annunciator coupled to the verifier signal analyzer and configured to produce a perceivable representation of at least one of the VoIP verification signal and the VoIP operational state.

2. The VoIP appliance of claim 1, wherein the verification initiator comprises:
   a verifier signal generator configured to form the VoIP verification request; and
   a verifier signal transmitter configured
      to receive the VoIP verification request from the verifier signal generator, and
      to transmit the VoIP verification request to the test node.

3. The VoIP appliance of claim 1, further comprising:
   a test loop link coupling the verification initiator with the verification processor to the VoIP appliance to function as a test node for a second VoIP appliance.

4. In a communications system having a test node receivingly coupled to an upstream datapath and transmittingly coupled to a downstream datapath, a VoIP appliance comprising:
   means for transmitting a VoIP verification request to the test node wherein the means for transmitting is coupled to the upstream datapath and wherein the test node forms a VoIP verification signal responsive to the VoIP verification request;
   means for receiving the VoIP verification signal from the test node, wherein:
      the test node is a provider-side Session Initiation Protocol (SIP) user agent and the VoIP verification signal is transmitted according to the SIP,
      the VoIP verification signal comprises an encoded message;
      the encoded message includes a text message encoded according to a text-based application-layer control protocol; and
      the text message is a SIP text message; and
   means for producing a perceivable representation of the VoIP verification signal.

5. The VoIP appliance of claim 4, wherein means for transmitting the VoIP verification request further comprises proxy agent means for transmitting a proxy VoIP verification request for a test VoIP appliance to a test node configured to receive the proxy VoIP verification request, wherein the proxy agent means is different from the test VoIP appliance.

6. The VoIP appliance of claim 4, wherein the means for transmitting the VoIP verification request further comprises:
   means for transmitting a verification telephony call request to the test node, wherein the VoIP appliance is a test VoIP appliance, and
   means for receiving a verification telephony call by the test VoIP appliance from the test node.

7. The VoIP appliance of claim 4, wherein the VoIP verification signal further comprises a VoIP operational state encoded into the VoIP verification signal.

8. The VoIP appliance of claim 4, wherein the VoIP verification request is an encoded text message encoded according to a text-based application-layer control protocol.

9. The VoIP appliance of claim 8, wherein the text-based application-layer control protocol is a Session Initiation Protocol (SIP).

10. The VoIP appliance of claim 5, wherein the VoIP verification request is an encoded Session Initiation Protocol (SIP) text message and representative of a VoIP operational state.

11. The VoIP appliance of claim 10, further comprising means for producing a perceivable representation of the VoIP operational state.

12. The VoIP appliance of claim 4, wherein the means for receiving the VoIP verification signal from the test node further comprises means for decoding the SIP text message as the VoIP verification signal, wherein the test node is a provider-side SIP user agent, and wherein the VoIP appliance is a subscriber-side SIP agent.

13. In a communications system having a VoIP appliance transmitting to a test node over an upstream datapath and receiving from the test node over a downstream datapath, a method for VoIP verification comprising:
   transmitting a VoIP verification request from the VoIP appliance, comprising transmitting the VoIP verification request from a proxy agent VoIP appliance, to the test node, wherein the test node is configured to receive the VoIP verification request;
   receiving a VoIP verification signal by the VoIP appliance, comprising receiving the VoIP verification signal by a test VoIP appliance, from the test node, wherein:
      the test VoIP appliance is different from the proxy agent VoIP appliance; and
      the test node formed the VoIP verification signal responsive to receiving the VoIP verification request; and
   producing a perceivable representation of the VoIP verification signal at the VoIP appliance.

14. The method of claim 13, wherein the VoIP verification signal comprises a text message encoded according to a text-based application-layer control protocol.

15. The method of claim 14, wherein the VoIP verification signal is transmitted according to the Session Initiation Protocol (SIP), wherein the text message comprises a SIP text message, wherein the VoIP appliance is a subscriber-side SIP user agent, and wherein the test node is a provider-side SIP user agent.

16. The method of claim 14, wherein a VoIP operational state is encoded into the VoIP verification signal, and further comprising, decoding the VoIP operational state from the VoIP verification signal and producing a perceivable representation of the VoIP operational state.

* * * * *

UNITED STATES PATENT AND TRADEMARK OFFICE
CERTIFICATE OF CORRECTION

PATENT NO.       : 7,596,092 B2                                        Page 1 of 1
APPLICATION NO. : 11/346917
DATED            : September 29, 2009
INVENTOR(S)      : Harrington et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-eighth Day of September, 2010

David J. Kappos
*Director of the United States Patent and Trademark Office*